United States Patent
Pope et al.

(10) Patent No.: US 10,225,980 B2
(45) Date of Patent: Mar. 12, 2019

(54) HAND TOOL

(71) Applicant: FAULTLESS STARCH/BON AMI COMPANY, Kansas City, MO (US)

(72) Inventors: Stephen M. Pope, Lenexa, KS (US); Scott Wayland, Lawrence, KS (US)

(73) Assignee: FAULTLESS STARCH/BON AMI COMPANY, Kansas City, MO (US)

( * ) Notice: Subject to any disclaimer, the term of this patent is extended or adjusted under 35 U.S.C. 154(b) by 80 days.

(21) Appl. No.: 15/148,040

(22) Filed: May 6, 2016

(65) Prior Publication Data

US 2016/0324060 A1   Nov. 10, 2016

Related U.S. Application Data

(60) Provisional application No. 62/157,774, filed on May 6, 2015.

(51) Int. Cl.
| | | |
|---|---|---|
| *A01B 1/20* | (2006.01) | |
| *B26B 11/00* | (2006.01) | |
| *B25G 1/10* | (2006.01) | |
| *A01B 1/04* | (2006.01) | |
| *A01B 1/12* | (2006.01) | |
| *A01B 1/06* | (2006.01) | |
| *A01D 7/00* | (2006.01) | |
| *A01C 5/02* | (2006.01) | |
| *B25G 3/26* | (2006.01) | |
| *A01B 1/22* | (2006.01) | |

(52) U.S. Cl.
 CPC ............... *A01D 7/00* (2013.01); *A01B 1/12* (2013.01); *A01B 1/222* (2013.01); *B25G 1/102* (2013.01); *B25G 3/26* (2013.01); *B26B 11/00* (2013.01)

(58) Field of Classification Search
 CPC .. A01D 7/00; A01B 1/12; A01B 1/222; B25G 3/26; Y10T 16/48; Y10T 16/498
 USPC .............................. 7/114; 172/371, 375, 378
 See application file for complete search history.

(56) References Cited

U.S. PATENT DOCUMENTS

| 314,479 A | * | 3/1885 | Richardson | ............. E04F 21/06 |
| | | | | 15/235.4 |
| 876,649 A | * | 1/1908 | Long | ........................ A01B 1/20 |
| | | | | 172/375 |

(Continued)

FOREIGN PATENT DOCUMENTS

| TW | 272923 | 3/1996 |
| TW | 301593 | 3/1997 |

(Continued)

OTHER PUBLICATIONS

U.S. Appl. No. 29/563,613, filed May 6, 2016, Pope et al.

*Primary Examiner* — Hadi Shakeri
(74) *Attorney, Agent, or Firm* — Stinson Leonard Street LLP

(57) ABSTRACT

The present invention is directed to a hand tool that includes an implement, a tang extending from the implement, and a handle secured tot the tang. The handle includes an opposing surface facing away from the implement, and a portion of the tang is configured to engage a portion of the opposing surface to mechanically lock the handle and tang together. The present invention is also directed to a multi-blade garden transplanter tool that includes at least three blades extending outward along a center axis from a free end to a handle end, and a handle is secured to the handle end.

36 Claims, 13 Drawing Sheets

(56) References Cited

U.S. PATENT DOCUMENTS

| | | | |
|---|---|---|---|
| 1,206,678 A * | 11/1916 | Cribbs | A01B 1/20 172/375 |
| 1,713,529 A | 5/1929 | Grant | |
| 2,928,483 A * | 3/1960 | Trost | A01G 20/30 172/378 |
| 2,931,445 A * | 4/1960 | Meredich | A01B 1/16 172/375 |
| 3,072,938 A * | 1/1963 | Phaneuf | A61C 17/222 15/176.6 |
| D257,551 S * | 11/1980 | Nadle | D10/46.2 |
| 4,524,514 A * | 6/1985 | Mallalieu | B25G 3/26 16/430 |
| D302,780 S | 8/1989 | Himbert | |
| D337,505 S | 7/1993 | Ming-Chang | |
| D352,873 S | 11/1994 | Chen | |
| D365,257 S | 12/1995 | Huang | |
| 5,581,889 A | 12/1996 | Reuter | |
| D462,003 S | 8/2002 | Juhlin | |
| 6,530,098 B1 * | 3/2003 | Gringer | B25B 15/00 7/105 |
| 6,662,406 B2 * | 12/2003 | Shonfeld | A01B 1/00 16/430 |
| D579,287 S | 10/2008 | Hyp | |
| D617,171 S | 6/2010 | Chang | |
| D682,055 S | 5/2013 | Hyp | |
| D720,583 S | 1/2015 | Hyp | |

FOREIGN PATENT DOCUMENTS

| | | |
|---|---|---|
| TW | 324645 | 1/1998 |
| TW | 396000 | 6/2000 |
| TW | 427851 | 3/2001 |
| TW | D181897 | 3/2017 |

* cited by examiner

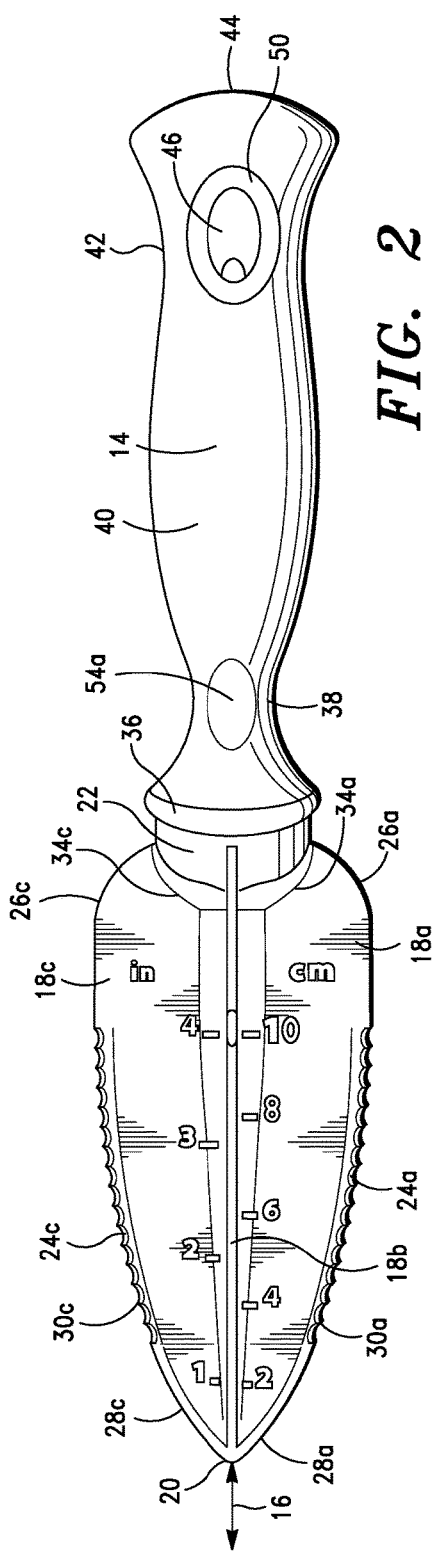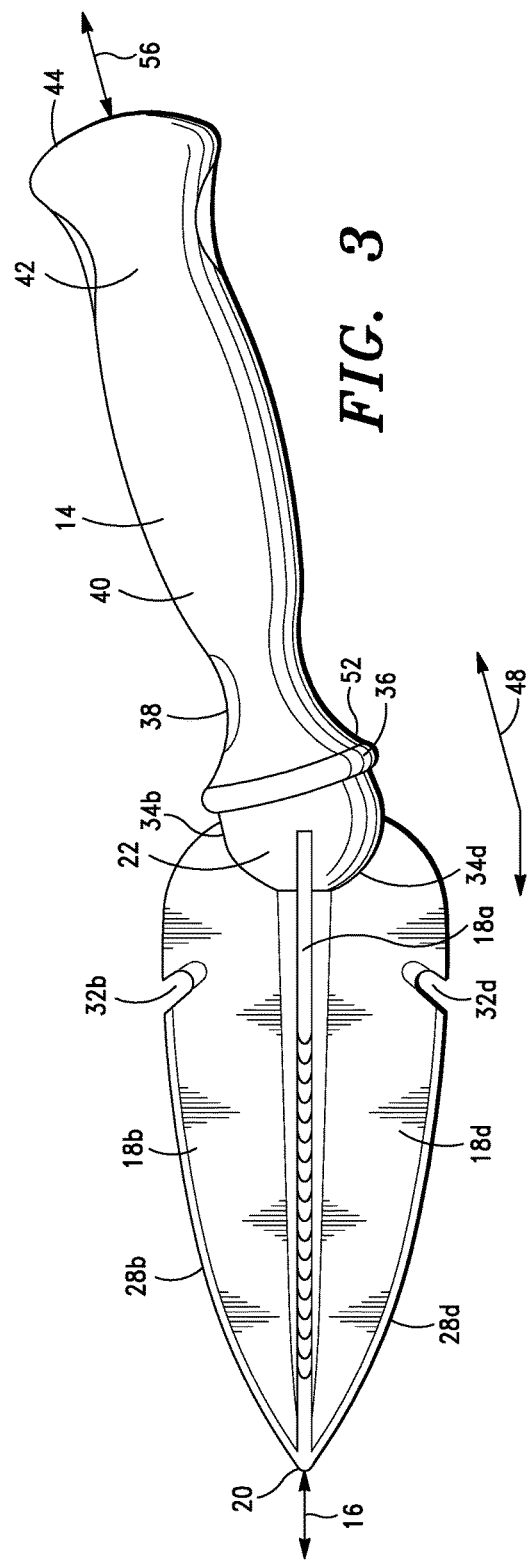

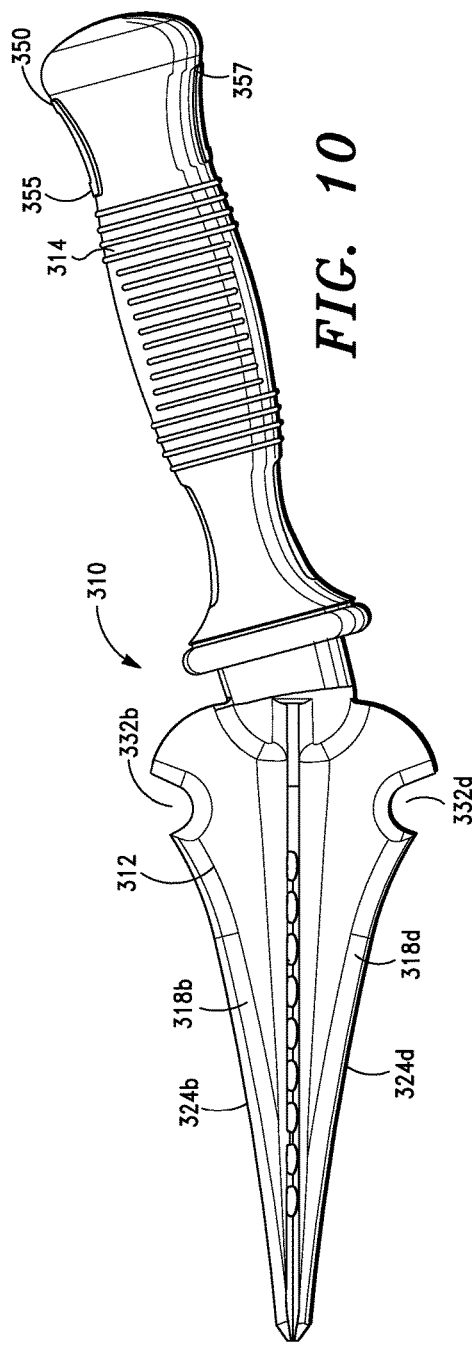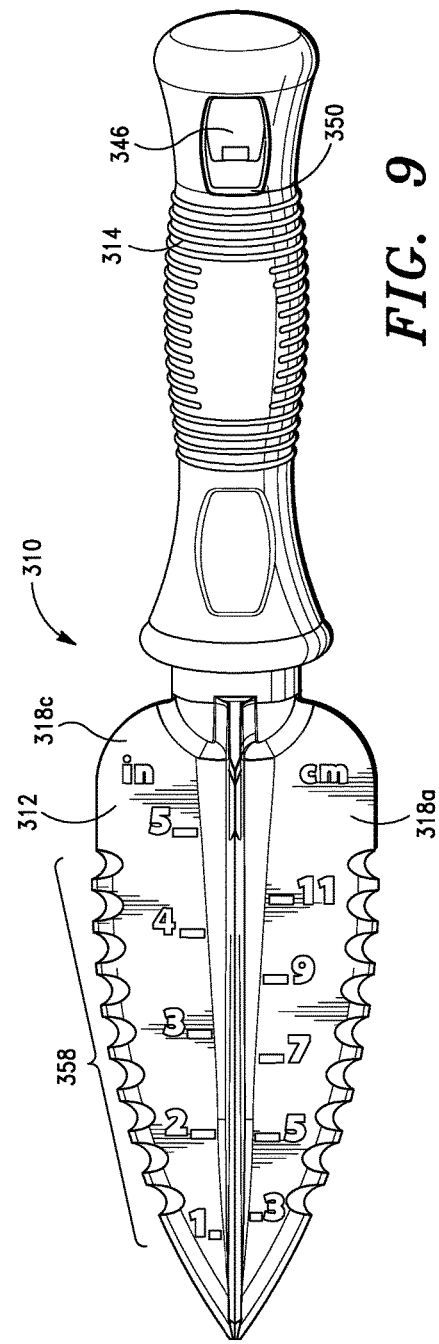

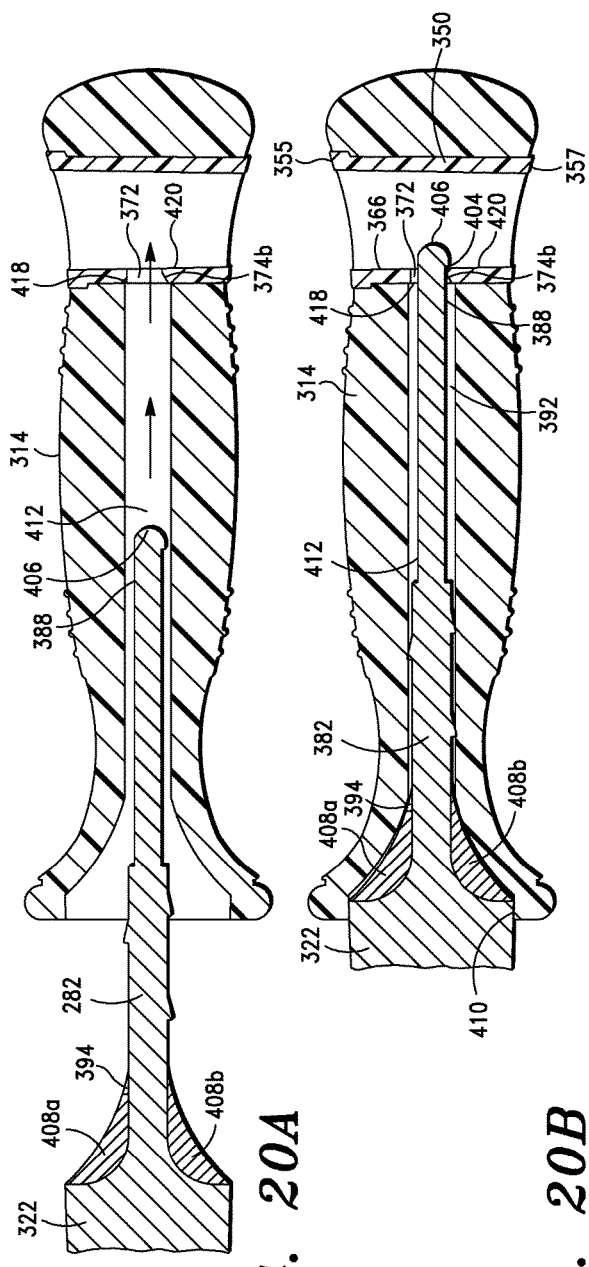
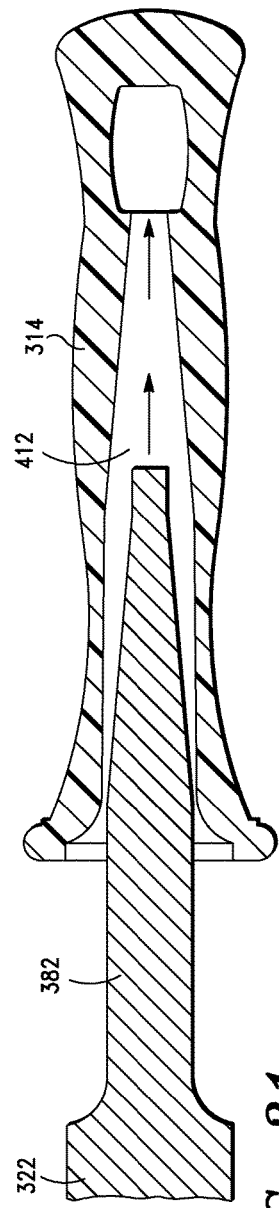
FIG. 20A  FIG. 20B  FIG. 21

HAND TOOL

CROSS-REFERENCE TO RELATED APPLICATIONS

This application is based on and claims priority to U.S. Provisional Application Ser. No. 62/157,774 filed on May 6, 2015, which is incorporated by reference in its entirety.

STATEMENT REGARDING FEDERALLY SPONSORED RESEARCH OR DEVELOPMENT

Not applicable.

BACKGROUND OF THE INVENTION

1. Field of the Invention

The present invention is directed to the field of hand tools, and more specifically directed to a hand-held garden tool.

2. Description of the Related Art

Various garden tools are known in the art for digging, loosening and cultivating soil for planting, transplanting, weeding, and otherwise maintaining a lawn or garden. Known hand-held garden hand tools, such as shovels, trowels, and hoes, are typically used for close-up, hands on work around delicate plants where larger, stand-up tools are too bulky or lack preciseness of use. While known hand-held tools are generally useful for their intended purposes, any given tool is limited in its ability to perform specific functions. For example, while a hand-held shovel is useful for digging into loose soil, it is not generally well-suited for digging into or loosening compacted soil. Similarly, while a hand-held trowel may be inserted into compacted soil, the generally flat configuration of the trowel blade prevents effectively twisting the tool to loosen the soil without compromising the integrity of the tool itself. Additionally, known hand-held garden tools are prone to breakage, especially at the juncture between the handle and the implement of a given hand tool. Thus, there remains a need in the art for an improved hand-held garden tool and for an improved means of securing hand-held garden tools to handles.

BRIEF SUMMARY OF THE INVENTION

In a first aspect, the present invention is directed to a multi-blade garden transplanter tool. The tool includes a blade assembly and a handle. The blade assembly includes at least three blades extending outward along a center axis from a free end to a handle end. The handle is secured to the handle end.

In one embodiment of the first aspect of the invention, the blade assembly includes four blades that terminate in a pointed free end.

In an embodiment of the first aspect of the invention, the blades are arranged symmetrically around a center axis.

In yet another embodiment of the first aspect of the invention, at least one of the blades includes serrations.

In still another embodiment of the first aspect of the invention, at least one of the blades includes a knife edge.

In one embodiment of the first aspect of the invention, at least one of the blades includes graduation markings.

In an embodiment of the first aspect of the invention, at least one of the blades includes a notch.

In still one more embodiment of the first aspect of the invention, at least one of the blades has a concave outer edge.

In one embodiment of the first aspect of the invention, at least one of the blades has a convex outer edge.

In a second aspect, the present invention is directed to a hand tool. The hand tool includes an implement, a tang, and a handle. The tang extends from the implement. The handle is secured to the tang and includes an opposing surface facing away from the implement. A portion of the tang is configured to engage a portion of the opposing surface to mechanically lock the handle and tang together.

In an embodiment of the second aspect of the invention, the tang is formed from a material having a higher durometer than the handle. Preferably, the tang is formed from metal selected from the group consisting of aluminum, iron, steel, and combinations thereof. Preferably, the handle is formed from plastic, rubber, composite, or combinations thereof.

In one embodiment of the second aspect of the invention, a portion of an end of the tang is in abutting contact with a portion of the opposing surface.

In another embodiment of the second aspect of the invention, the end of the tang includes a hook that is in abutting contact with a portion of the opposing surface.

In yet another embodiment of the second aspect of the invention, the opposing surface extends generally perpendicular a longitudinal axis of the tool.

In still another embodiment of the second aspect of the invention, the handle includes an internal passageway configured to receive the tang. Preferably, the tang is press fit into the internal passageway. Preferably, the opposing surface is defined by an aperture ring extending through the handle generally perpendicular a longitudinal axis of the tool. Preferably, the aperture ring includes a slot through which the tang extends. Preferably, a portion of the tang is in abutting contact with an inner surface of the slot and a portion of the tang is in abutting contact with a portion of the opposing surface defined by the aperture ring. Preferably, a portion of the inner surface of the slot adjacent the opposing surface is angled to press against a portion of the tang. Preferably, the tang includes teeth that are configured to engage a portion of the handle along the internal passageway. Preferably, the tang includes a channel on a first surface of the tang that is configured to receive an adhesive, and the channel includes a slot that is configured to allow an adhesive to drain from the first surface of the tang to a second surface of the tang. Preferably, the handle includes a flared safety barrier positioned adjacent the implement. Preferably, the tang and the aperture ring are formed from a material having a higher durometer than the handle. Preferably, the tang and the aperture ring are formed from metal selected from the group consisting of aluminum, iron, steel, and combinations thereof. Preferably, the handle is formed from plastic, rubber, composite, or combinations thereof.

In another embodiment of the second aspect of the invention, the implement is selected from the group consisting of a planter, a shovel, a trowel, a hoe, a transplanter, a cultivator, a rake, and a scoop.

In an embodiment of the second aspect of the invention, the implement includes a plurality of three or more blades extending outward along a center axis.

In still another embodiment of the second aspect of the invention, the tang extends at least approximately ½ the length of the handle and may extend the entire length of the handle. Preferably, the tang extends approximately ⅝ to ⅞ the length of the handle and most preferably approximately ¾ to ⅚ the length of the handle.

In yet another embodiment of the second aspect of the invention, the tool includes a hub and at least one rib extending from the hub to the tang. Preferably, the handle includes a boss having a shape complimentary to the hub, and the boss is configured to receive a portion of the hub.

In an embodiment of the second aspect of the invention, the handle extends at an angle from a center axis of the implement. Preferably, the angle is between approximately 0 to 30 degrees, depending on the type and functionality of the implement. For transplanters and trowels, the angle is preferably approximately 5 to 25 degrees and most preferably 10-20 degrees.

In one embodiment of the second aspect of the invention, the handle includes a rounded, bulbous end cap configured to allow a user to exert force on the handle using a palm of the user's hand.

In still another embodiment of the second aspect of the invention, the handle is symmetrical about a central axis.

Additional aspects of the invention, together with the advantages and novel features appurtenant thereto, will be set forth in part in the description which follows, and in part will become apparent to those skilled in the art upon examination of the following, or may be learned from the practice of the invention. The objects and advantages of the invention may be realized and attained by means of the instrumentalities and combinations particularly pointed out in the appended claims.

BRIEF DESCRIPTION OF THE DRAWINGS

FIG. 2 is a top view of the transplanter tool of FIG. 1.

FIG. 3 is a side view of the transplanter tool of FIG. 1.

FIG. 9 is a top view of the transplanter tool of FIG. 8.

FIG. 10 is a side view of the transplanter tool of FIG. 8.

FIG. 20A is a side view showing the handle in cross section and a portion of the blade assembly and tang being inserted into the handle of the transplanter tool of FIG. 8.

FIG. 20B is a side view showing the handle in cross section and a portion of the blade assembly and tang of the transplanter tool of FIG. 8.

FIG. 21 is a top cross-sectional view showing a portion of the blade assembly and tang being inserted into the handle of the transplanter tool of FIG. 8.

DETAILED DESCRIPTION OF EXEMPLARY EMBODIMENTS

Figure 1:
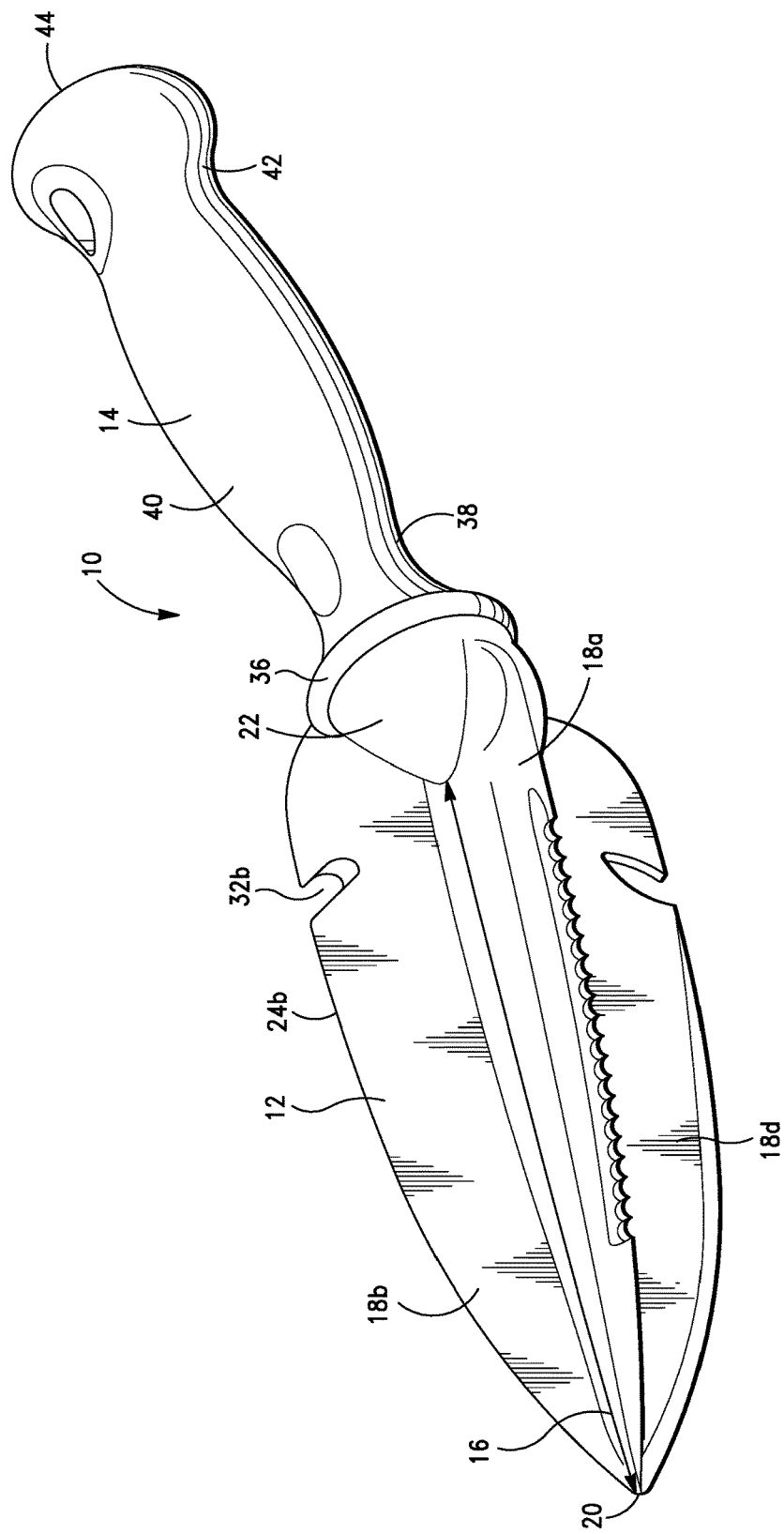
FIG. 1 is a perspective view of a multi-blade garden transplanter tool in accordance with a first exemplary embodiment of the first aspect of the present invention.

A multi-blade garden transplanter tool in accordance with an exemplary embodiment of the first aspect of the present invention is shown in FIG. 1 and designated generally by the reference numeral 10. Transplanter 10 includes a blade assembly 12 fixedly attached to a handle 14 to allow a user to manipulate the blade portion to loosen, cut, and work garden and lawn soil and to use the features and tools incorporated into the blades as will be described in more detail below.

As best seen in viewing the embodiment of FIGS. 1-3, blade assembly 12 includes four blades 18a-d extending outward along a center axis 16 from a front pointed outer end 20 to a rearward hub 22. Blades 18a-d are arranged symmetrically, clocked approximately every ninety degrees, around center axis 16 to form a cross-shaped blade assembly 12. Although blade assembly 12 is shown with four blades, it is nonetheless within the scope of the present invention for the blade assembly to have any number of blades greater than two, and the blades need not necessarily be positioned around the center axis symmetrically.

Blade assembly 12 is preferably of singular construction and may be formed or cast in a mold, by welding blades 18 to one another, or by other methods known to those of ordinary skill in the art. Blades 18 of blade assembly 12 are preferably formed from a strong, rigid material, such as metal, a composite material, or combinations thereof. Most preferably, blades 18 are formed from a metal alloy such as a mixture of iron and aluminum; steel and aluminum; or iron, steel, and aluminum. The thickness of blades 18 may vary depending on the material from which they are constructed and the desired stiffness of blades 18. Most preferably, when formed of an aluminum and iron mixture, the thickness of blades 18 is in the range of approximately $\frac{1}{16}$ inch to $\frac{1}{8}$ inch. The thickness of blades 18 may also vary, and blades 18 preferably are thicker adjacent center axis 16.

As best seen in FIG. 2 with reference to blade 18a, each blade 18a-d is generally triangular shaped, having a respective convex, curvilinear outer edge 24a-d extending from the pointed outer end 20 to a respective sharply curved back edge 26a-d at the juncture between each blade 18a-d and hub 22.

Looking still to FIG. 2, with reference to blade 18c, the outer edge 24c of blade 18c includes a knife edge portion 28c extending from the pointed outer end 20 of blade assembly 12 a distance rearward, preferably to approximately one fifth the length of outer edge 24c. As is known in the art, knife edge portion 28c is formed by sharpening the edge thickness of the blade to a point along the desired length. Knife edge portion 28c is configured to cut string, twine, or to cut and score lines into soil.

Blade 18c further includes a serrated portion 30c extending along outer edge 24c, from the knife edge portion 28c a distance towards the handle 14, preferably approximately one half of the length of outer edge 24c. Serrated portion 30c is formed of a plurality of alternating sharpened teeth arranged linearly along outer edge 24c. Serrated portion 30c is operable to cut through compacted soil, lawn bags, and the like.

Referring to FIG. 1, outer edge 24b of blade 18b is sharpened into a knife edge along its entire length. Notch 32b is formed in outer edge 24b of blade 18b and is positioned along the widest portion of blade 18b forward of handle 14. Notch 32b slants diagonally toward handle 14 and down from outer edge 24b of blade 18b, having a width of approximately ¼ inch. The portion of outer edge 24b defining and surrounding notch 32b is preferably sharpened into a knife edge so that notch 32b may be used to cut rope or other similar gardening materials. Notch 32b also provides enhanced root cutting capability to tool 10 when inserted into the ground and rotated.

As can be seen in FIGS. 1-3, the configuration of the individual blades 18a-d need not be identical, and can vary depending upon the desired configuration. For example, as seen in the embodiment shown in FIG. 2, blades 18a and 18c, positioned on opposite sides of transplanter tool 10 and generally extending within the same plane, are identical to one another, each having respective knife edge portions 28a, c extending from pointed outer end 20, transitioning to respective serrated portions 30a, c along the majority of the respective outer edges 24a, c, and concluding with respective curved back edges 26a, c. Referring to FIG. 3, blades 18b and 18d are likewise positioned on opposite sides of transplanter tool 10, generally extend within the same plane, and are identical to one another. In contrast to blades 18a and 18c, blades 18b and 18d include respective knife edge portions 28b, d along the majority of their respective outer edges 22b, d, with respective notches 32b, d, as described above, formed in each blade.

Referring to FIGS. 2-3, the rear ends 34a-d of respective blades 18a-d are joined with a generally hemispherical hub 22. Hub 22 is preferably formed of a strong, rigid material, such as a metal or metal alloy. Hub 22 is preferably comprised of the same material as blades 18 and is most preferably integrally formed therewith. Hub 22 provides additional rigidity and strength to the blade assembly. Although hub 22 as shown is hemispherical, it is within the scope of the present invention for hub 22 to be other shapes, including but not limited to cubical or oval.

Figure 5:
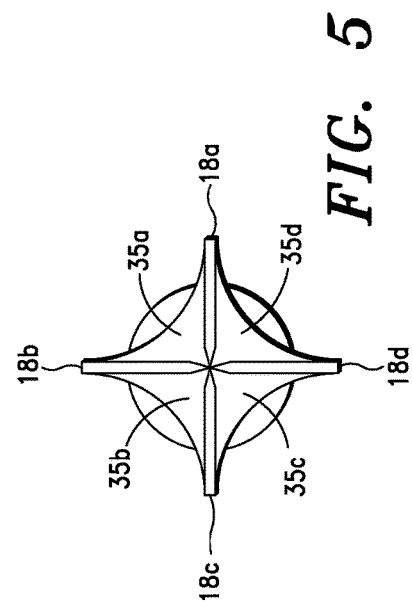
FIG. 5 is a front end view of the blade assembly of the transplanter tool of FIG. 1.
Figure 6:
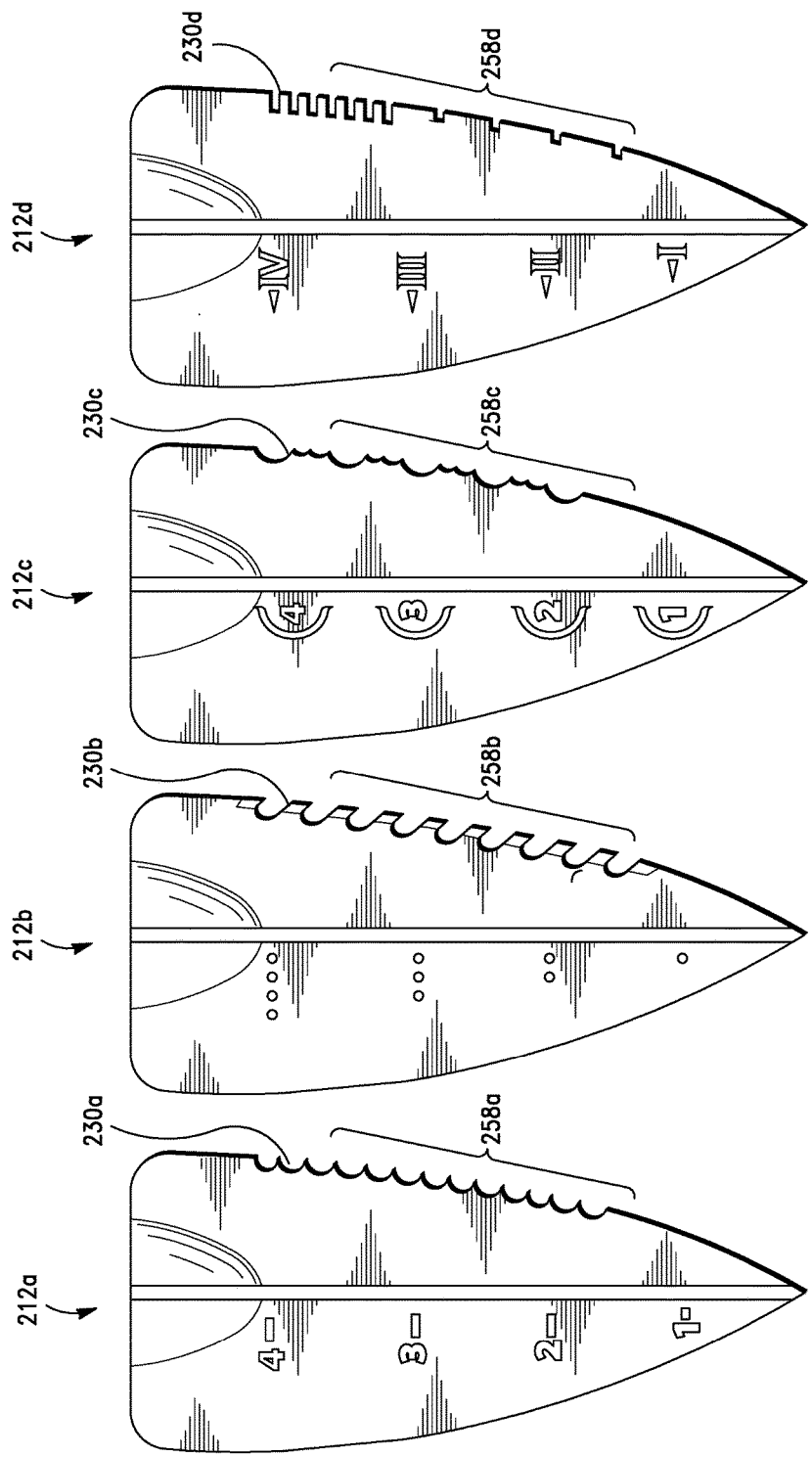
FIGS. 6a-6d are top views of the blade portion of various exemplary embodiments of the transplanter tool of the first aspect of the present invention.
Figure 7:
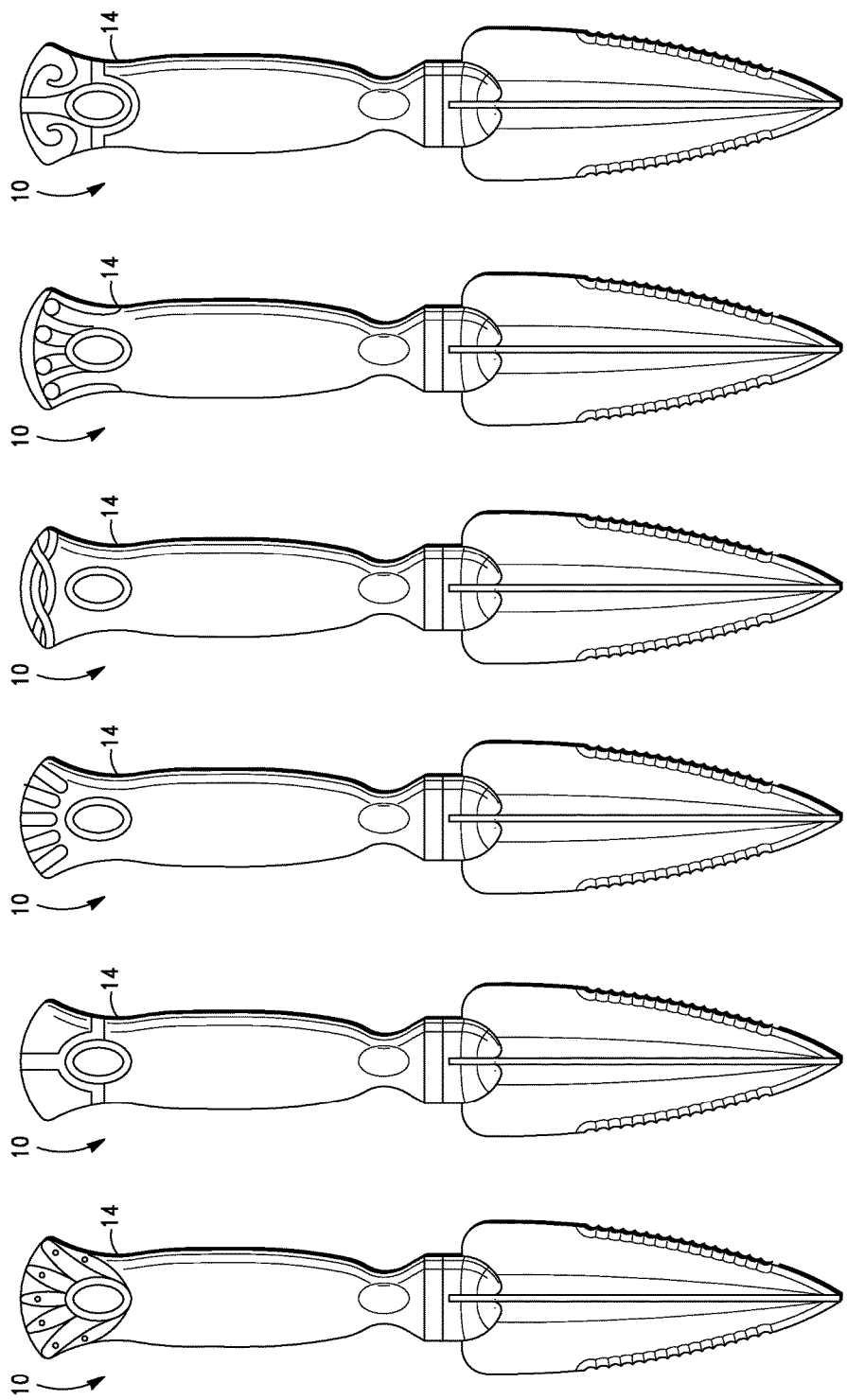
FIGS. 7a-7f are top views of various exemplary embodiments of the handle portion of the transplanter tool of the first aspect of the present invention.

Pointed outer end 20 of blade assembly 12 allows penetration of compacted soil, and serrated portions 30 likewise ease the task. Knife edges 28 are useful for scoring and cutting soil. Pointed outer end 20 and knife edges 28 also can be used together to cut into bags of mulch or soil. Notches 32 can be used to cut rope, roots, and the like. As shown in FIG. 5, the cross configuration of blades 18a-d forms triangular shaped pockets 35a-d between each pair of blades that can be used to scoop and move soil.

Still looking to FIGS. 2-3, elongated handle 14 extends rearwardly from hub 22 to provide an ergonomic grip to a user for manipulating blades 18 of transplanter tool 10. Preferably, handle 14 includes a boss having a shape complimentary to the hub that receives the hub. As seen in FIGS. 1-3, handle 14 comprises a cylindrical boss 36 abutting and encircling a rear portion of the hemispherical hub 22 of blade assembly 12 and connecting handle 14 to blade assembly 12. Referring to FIGS. 2-3, boss 36 conforms to the circumference of the hub to receive a rear portion of hub 22. Handle 14 extends rearwardly from boss, tapering a distance to a narrower neck portion 38 located behind boss 36, and then increases in diameter from the neck portion 38 to a wider middle grip portion 40 that preferably extends between ⅛ and ⅞ the length of handle 12, more preferably extends between ⅙ and ⅚ the length of handle 12, and most preferably extends between ¼ and ¾ the length of handle 12. As shown in FIG. 2, middle grip portion 40 extends approximately ⅗ of the length of handle 14 before tapering inward to a waist portion 42 and then flaring outward and terminating in a bulbous end cap 44. Referring again to FIG. 2, an aperture 46 formed through the handle, just forward of the end cap 44, allows tool 12 to be stored on a peg or hook, or allows a lanyard or clip to be attached. An aperture ring 50 is preferably fixedly secured within aperture 46.

As best seen in FIG. 3, it can be seen that handle 14 extends upwardly from center axis 16 of blade assembly 12 (toward 24b of blade 18b) at angle 48 to provide a comfortable, ergonomic grip to a user. Angle 48 preferably ranges between 0 and 30 degrees, more preferably ranges between 5 and 25 degrees, and most preferably ranges between 10 and 20 degrees. In the embodiment shown, angle 48 is approximately 15 degrees. Blades 18 are secured to hub 22 such that it is slightly off-center; hub 22 is generally aligned with handle 14 such that it too is at an angle 48 with respect to center axis 16 of blade assembly 12.

Referring to FIG. 3, a flared portion 52 of handle 14, between boss 36 and neck portion 38 provides a flared safety barrier to protect a user's hand from sliding forward into blade assembly 12. Referring to FIG. 2, a thumb depression area 54a in neck portion 38 is configured to receive a user's thumb, allowing a comfortable and secure grip, and likewise preventing a user's hand from sliding forward on the tool. An identical thumb depression 54b (not shown) is positioned on the opposite side of handle 14, and thumb depressions 54a and 54b are generally aligned with blades 18b and 18d. It will be understood that thumb depression areas 54a and 54b may be positioned on opposite sides of handle 14 in a variety of positions within neck portion 38 other than as shown in FIG. 2. For example, thumb depressions 54a and 54b may be generally aligned with blades 18a and 18c. Middle grip portion 40 provides a wide, generally cylindrical gripping surface that conforms to a user's hand. As seen in FIGS. 1-3, the middle grip portion 40 is contoured into a barrel shape between neck and waist portions 38 and 42, having a larger diameter in its center and tapering to smaller diameter ends towards neck and waist portions 38 and 42 respectively. The bulbous end cap 44 terminating the end of the handle 14 provides a large, wide, smooth and rounded surface that allows a user to exert force on the end of the tool 10 using the palm of his or her hand to allow digging and working tool 10 into compacted soil.

As further seen in FIGS. 1-3, handle 14 is symmetrical about its center axis 56 (shown in FIG. 3) so that the features and ergonomics of the handle can equally be used by either right or left handed users. The symmetrical handle further allows the tool to be rotated to any desired orientation to allow any of the blades, and the various features of those blades, to be employed as desired by a user.

Handle 14 is preferably formed from a strong, light material, such as plastic, rubber, composite, metal, metal alloys or wood. In one embodiment, handle 14 is formed from acrylonitrile butadiene styrene (ABS plastic). As discussed in more detail below, handle 14 preferably has a soft or lower durometer outer layer for easier gripping.

In some embodiments, portions of handle 14, such as boss 36, end cap 44, or aperture ring 50 may be made of a different material affixed to handle 14, such as metal inserts or pieces used to enhance the strength and to improve the appearance of handle 14.

The length of blade assembly 12 is preferably between 4 and 9 inches, more preferably between 5 and 8 inches, and most preferably between 6 and 7 inches. The length of handle 14 is preferably between 5 and 8 inches, more preferably between 5½ and 7½ inches, and most preferably between 6 and 7 inches. The overall length of transplanter tool 10 as measured from pointed end 24 to bulbous end cap is preferably between 10 and 16 inches, more preferably between 11 and 15 inches, and most preferably between 12 and 14 inches.

In some embodiments, handle 14 includes an internal passageway configured to receive a stud or tang projecting rearward from the blade assembly to attach the handle and blade assembly as described in more detail below. In other embodiments, handle 14 may be screwed, welded, or otherwise affixed to the blade assembly using any attachment method known in the art.

As just described, the four blade configuration of the transplanter tool allows easy penetration of hardened soil and scooping and moving of soil. Furthermore, the four blade configuration can be used to form a cylindrical hole in soil for planting bulbs, plants, and the likes. By inserting the tool into the soil and rotating and pulling while removing the tool, the four blade configuration acts as an auger to pull soil up and out, leaving a generally cylindrically shaped hole suited for planting bulbs. The blade serrations and sharpened blades work in concert when rotated to form the sides of the cylindrical hole formed by the removal of soil.

Figure 4:
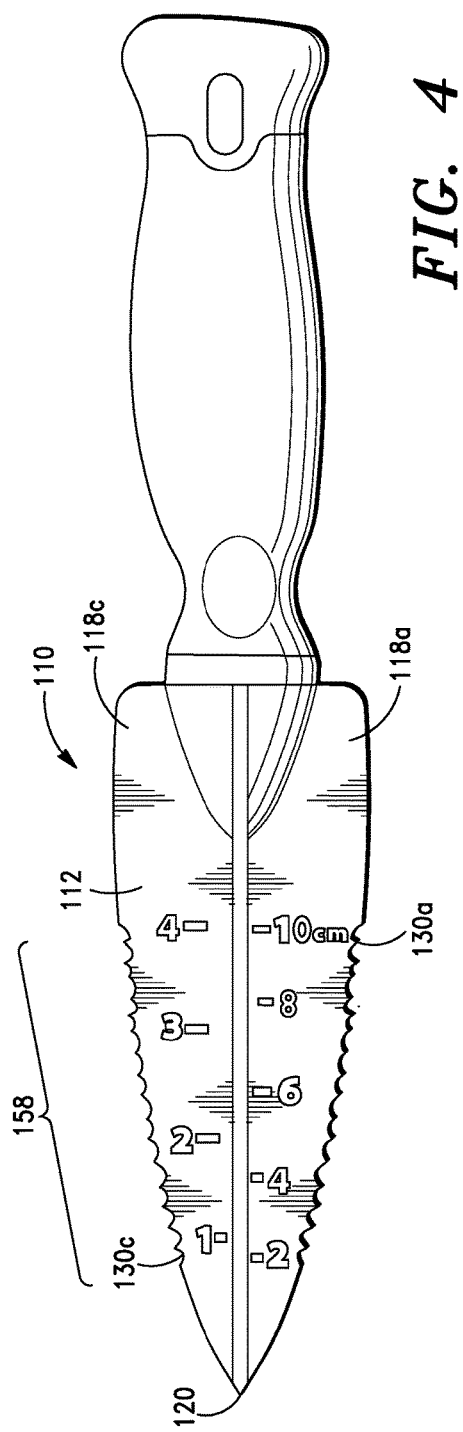
FIG. 4 is a top view of a multi-blade transplanter tool in accordance with a second exemplary embodiment of the first aspect of the present invention.

Looking to FIG. 4, an alternative embodiment of the multi-blade transplanter tool of the present invention generally designated with the reference numeral 110 includes a blade assembly 112 formed from a plurality of blades 118. Blades 118a and 118c each include a series of graduation marks 158 imprinted or engraved thereon, so that a distance from front pointed end 120 can be easily ascertained by a user. Thus, blades 118a and 118c may be used to measure planting depth in soil or to measure the length of twine, rope, or the like. Preferably graduation marks 158 are imprinted on blades 118a and 118c, most preferably they are stamped, molded, or cast into blades 118a and 118c. As shown in FIG. 4 graduation marks 158 may be in English, metric, or other units as desired. As also can be seen in FIG. 4, in addition to graduation marks 158, blades 118a and 118c may include serrated portions 130a and 130c as previously described.

As shown in FIGS. 6a-6d and as discussed above, the blades and features on the blades of the transplanter tool of the present invention may be combined in various configurations as desired for a particular tool. FIGS. 6a-6d depict respective blade assemblies 212a, 212b, 212c, and 212d wherein each blade assembly includes respective sets of graduation markings 258a, 258b, 258c and 258d and respective serrated portions 230a, 230b, 230c and 230d. Graduation markings 258a-d are Arabic numerals, a series of dots, a decorative Arabic numeral design, and Roman numerals, respectively. Serrated portions 230a-d each illustrate various combinations of blade serrations in accordance with various embodiments of the present invention. All of these variations and combinations are contemplated by and within the scope of the present invention. Similarly, as seen in FIGS. 7a-7f, variations in the decorative ornamentation of the handle 14 of the transplanter tool 10 are depicted and are within the scope of the present invention.

Looking to FIGS. 8-11, an exemplary embodiment of a tool of the second aspect of the present invention is shown and generally designated with the reference numeral 310. Although the implement of transplanter tool 310 is a blade assembly 312 similar to blade assembly 10 described above (some differences are discussed below), it is nonetheless within the scope of the present invention for the implement of tool 310 to be any other implement including but not limited to a planter, a shovel, a trowel, a hoe, a cultivator, a rake, or a scoop. It is also within the scope of the present invention for the implement of tool 310 to not be positioned at an angle with respect to the center axis of the implement.

Transplanter tool 310, like transplanter tool 10, includes a blade assembly 312, a handle 314, an aperture 346 within handle 314, and an aperture ring 350, generally as described above. Differences between blade assembly 312 and blade assembly 12 and differences between handle 14 and handle 314 are discussed below.

Referring to FIG. 9, blades 318a and 318c of blade assembly 312 are identical to blades 18a and 18c of blade assembly 12 (see FIG. 2), though blades 318a and 318c further include graduation markings 358 which are described above in connection with the embodiments shown in FIGS. 4 and 6A through 6D. Referring to FIG. 10, blades 318b and 318d—like blades 18b and 18d of transplanter tool 10 (shown in FIG. 3)—each include respective curvilinear outer edges 324b, 324d. However, unlike outer edges 24b, d of blades 18b, 18d, outer edges 324b, d are concave such that blades 318b, 318d are relatively narrow along most of their length, expanding to a larger width at the junction of blades 318b, 318d with hub 322. With opposing blades 318b, d configured more narrowly as depicted (in contrast to blades 18b, d of tool 10), tool 310 is more easily inserted into the ground and is more easily rotated by a user than tool 10 because of the lesser surface area of blades 318b, d. Blades 318b, d each include identical respective notches 332b, d that are similar to notches 32b, d of blades 18b, 18d (see FIG. 3). However, with reference to notch 332b, notch 332b differs from notch 32b in that it slants diagonally away from handle 314 and down from the outer edge 324b of blade 318b (rather than diagonally toward handle 314 and down from the outer edge 324b). Further, notch 332b is wider and slightly more rounded to facilitate cutting larger diameters of materials such as ropes and roots. Notches 332b, d provide enhanced root cutting capability to the tool when the tool is inserted into the ground and rotated.

Figure 8:
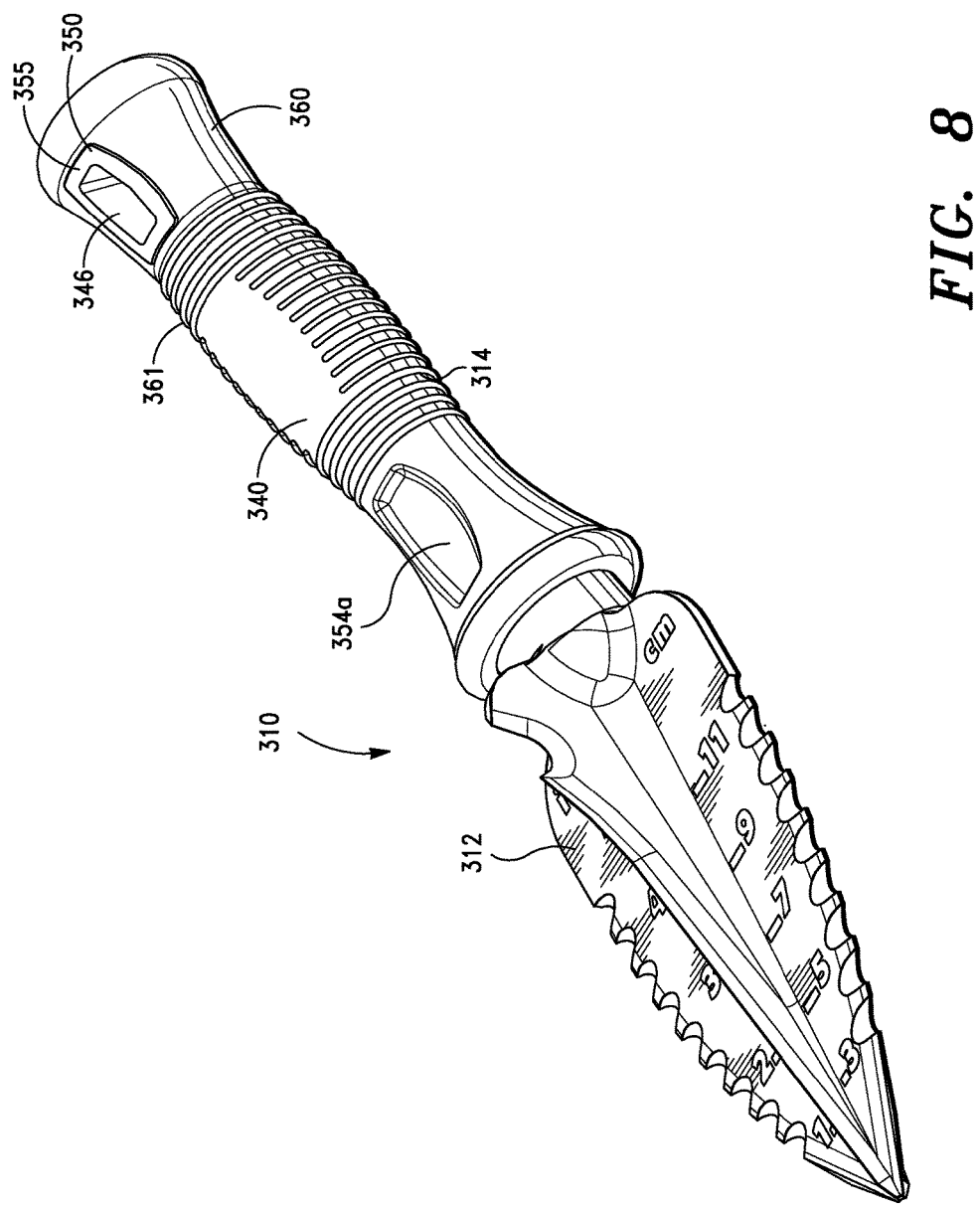
FIG. 8 is a perspective view of a multi-blade garden transplanter tool in accordance with a third exemplary embodiment of a first aspect of the present invention and an exemplary embodiment of a second aspect of the present invention.
Figure 11:
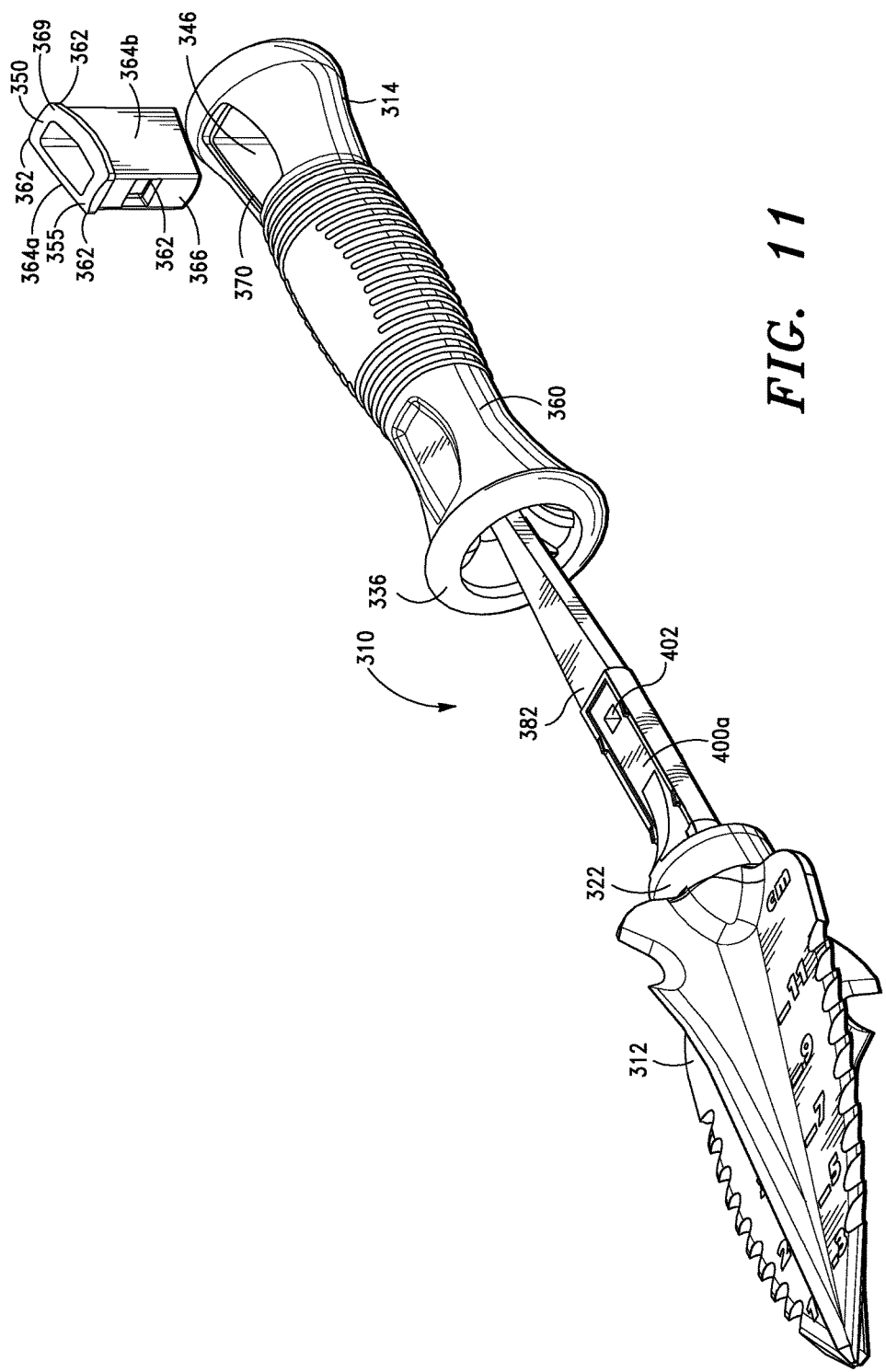
FIG. 11 is a perspective exploded view of the transplanter tool of FIG. 8.

With reference to FIG. 8, handle 314 preferably includes an outer layer 360 encapsulating handle 314 that makes handle 314 easier to grip and more comfortable within the hand of a user. Handle 314 is shown without outer layer 360 in FIG. 18. Referring to FIG. 11, it is noted that outer layer 360 is preferably not applied to aperture 346, contact surface 370 (described below), or boss 336. Suitable materials for outer layer 360 include but are not limited to rubber and thermoplastics. In one embodiment, outer layer 360 is formed from thermoplastic elastomers (TPE) and/or thermoplastic rubbers (TPR). Outer layer 360 can be applied to handle 314 by methods known in the art. With reference to FIG. 8, outer layer 360 of grip portion 340 may include textural features 361 as are known in the art to improve a user's ability to grip handle 14. Textural features 361 can be a wide-variety of patterns and shapes and may be created through known methods such as knurling or molding. As shown, textural features 361 are cylindrical ribs. Thumb depression areas 354a-b differ from thumb depression areas 54a-b in size and shape, but serve identical purposes and functions.

Figure 18:
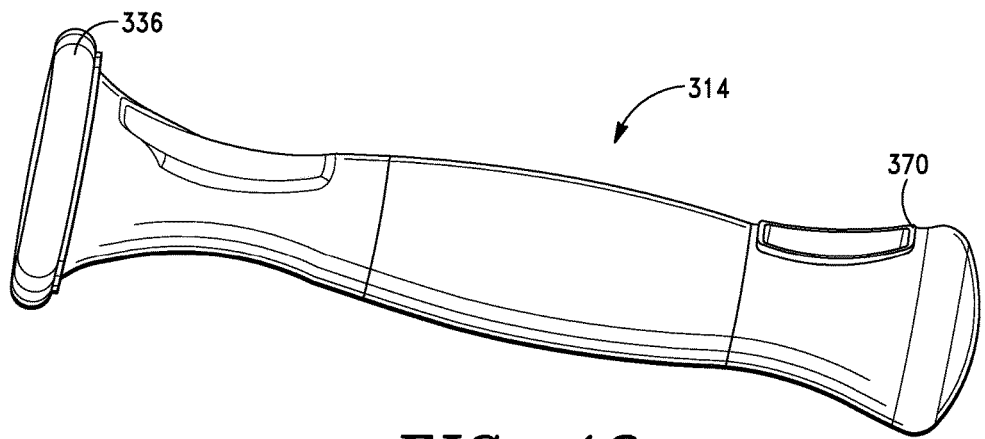
FIG. 18 is a side perspective view of the handle of the transplanter tool of FIG. 8.
Figure 12:
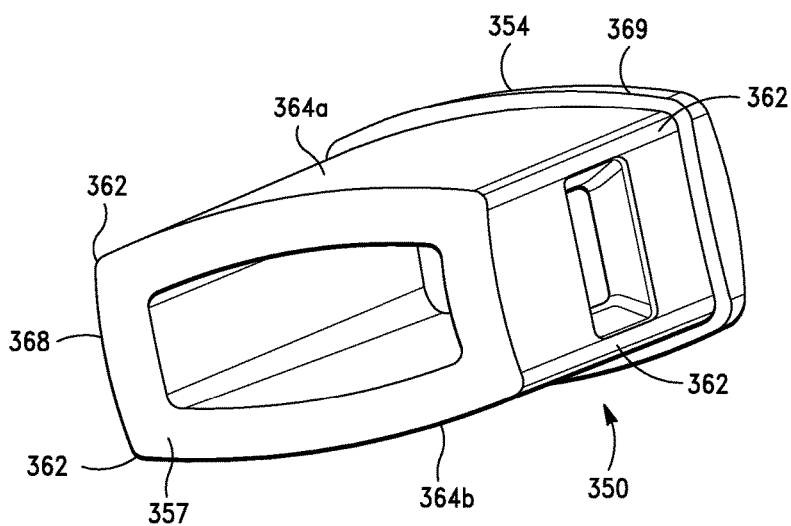
FIG. 12 is a perspective bottom side view of the aperture ring of the transplanter tool of FIG. 8.

Having addressed the differences between transplanter tools 310 and 10, the remaining features of the second aspect of the present invention will now be described. Referring to FIGS. 11 and 12, aperture ring 350 has a cross-section that is generally rectangular shaped when viewed from either its top side 355 or bottom side 357. Aperture ring 350 includes four rounded corners 362, opposing curvilinear, convex sides 364a, b, opposing, generally flat front end and rear end 366 and 368, and a protruding lip 369. Front end 366 faces blade assembly 312 and rear end 368 faces bulbous handle end cap 344. Aperture ring 350 preferably is press fit into corresponding aperture 346 formed in handle 314. Aperture ring 350 fits flush against the outer surface of handle 314 when fully inserted into aperture 346. This is because protruding lip 369 around the top side 355 of aperture ring 350 is contoured to the corresponding contact surface 370 of handle 314 (as best shown in FIG. 18), and as shown in FIGS. 10 and 11, aperture ring 350 has a shape complimentary to aperture 346 such that only the outer most surfaces of top side 355 and bottom side 357 are visible. Aperture ring 350 is preferably formed of a strong, rigid material, such as a metal, a composite material, aluminum, iron, or steel, or combinations thereof. Preferably, the durometer of aperture ring 350 is greater than the durometer of handle 314.

Figure 13:
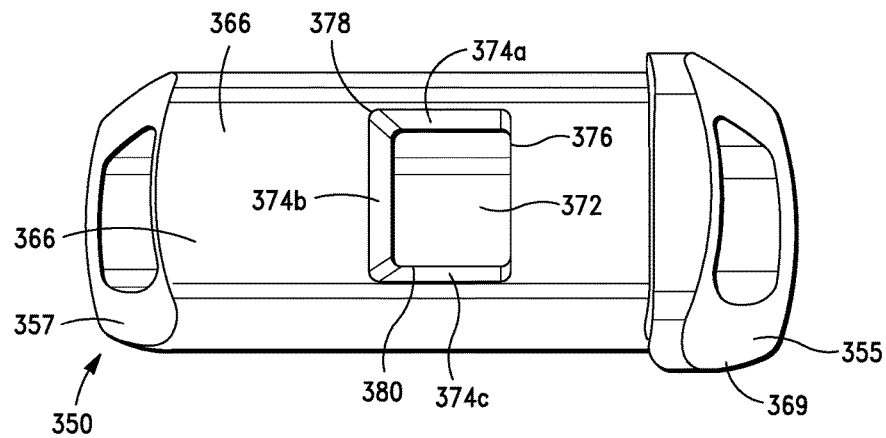
FIG. 13 is a perspective front end view of the aperture ring of the transplanter tool of FIG. 8.

As seen in FIG. 13, a slot 372 is formed in front end 366 of aperture ring 350. Slot 372 is generally rectangular in shape having four side walls. The top, bottom and left sidewalls 374a-c are sloped inwardly toward the center of slot 372 from the front to back of slot 372. In this manner, the outer perimeter 378 of slot 372 at the front of slot 372 is slightly larger than the inner perimeter 380 of slot 372 at the rear of slot 372. Right sidewall 376 is relatively flat or planar from the front to the back of slot 372 and is generally perpendicular with front end 366. As will be discussed in more detail below, a hook formed in a tang extending through an internal passageway of handle 314 engages the sidewalls 374a-c and a rear face of front end 366 of aperture ring 350 to secure the tang to aperture ring 350.

As shown in FIGS. 11 and 14-17, a tang 382 extends rearwardly from hemispherical hub 322 of blade assembly 312. Tang 382 is preferably formed of a strong, rigid material, such as a metal, a composite material, aluminum, iron, or steel, or combinations thereof. Most preferably, tang 382 is formed of the same material as blade assembly 312 and hub 322. Forming tang 382 from a strong, rigid material provides added strength to handle 314. Preferably, tang 382, hub 322 and blade assembly 312 are of singular or unitary construction and may be formed in a mold. Preferably, the durometer of tang 382 is greater than the durometer of handle 314. With reference to FIG. 20B, tang 382 preferably extends at least approximately ½ the length of handle 314 and up to the entire length of the handle, more preferably between approximately ⅝ and ⅞ the length of handle 314, and most preferably between approximately ¾ and ⅚ the length of handle 314. In one preferred embodiment, tang 382 extends approximately ⅚ of the length of handle 314. With tang 382 extending through a majority of handle 314, load placed on handle 314 is distributed to the stronger tang 382 and through the entire blade assembly 312, providing additional strength to the entire transplanter tool 310.

Figure 14:
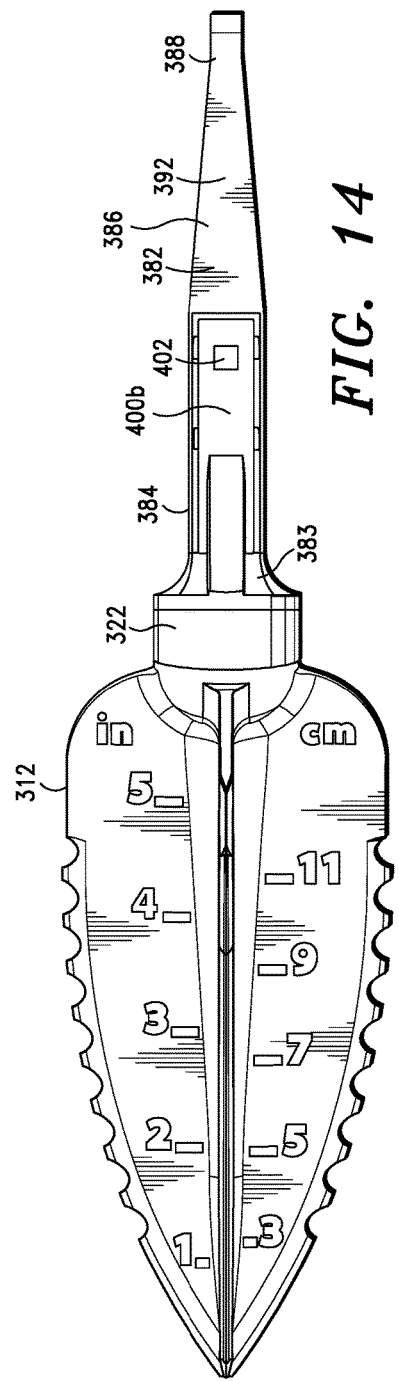
FIG. 14 is a bottom view of the blade assembly and tang of the transplanter tool of FIG. 8.
Figure 15:
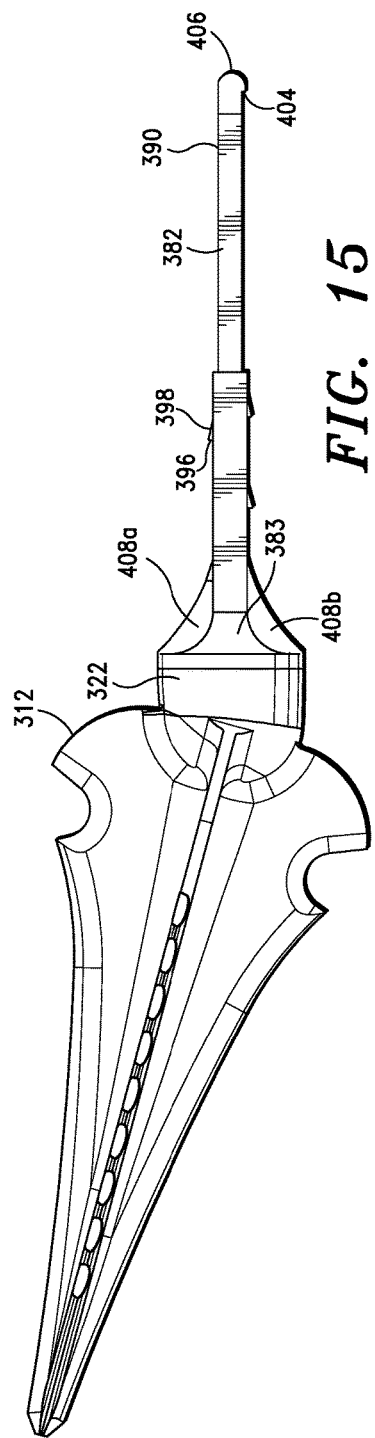
FIG. 15 is a side view of the blade assembly and tang of the transplanter tool of FIG. 8.
Figure 17:
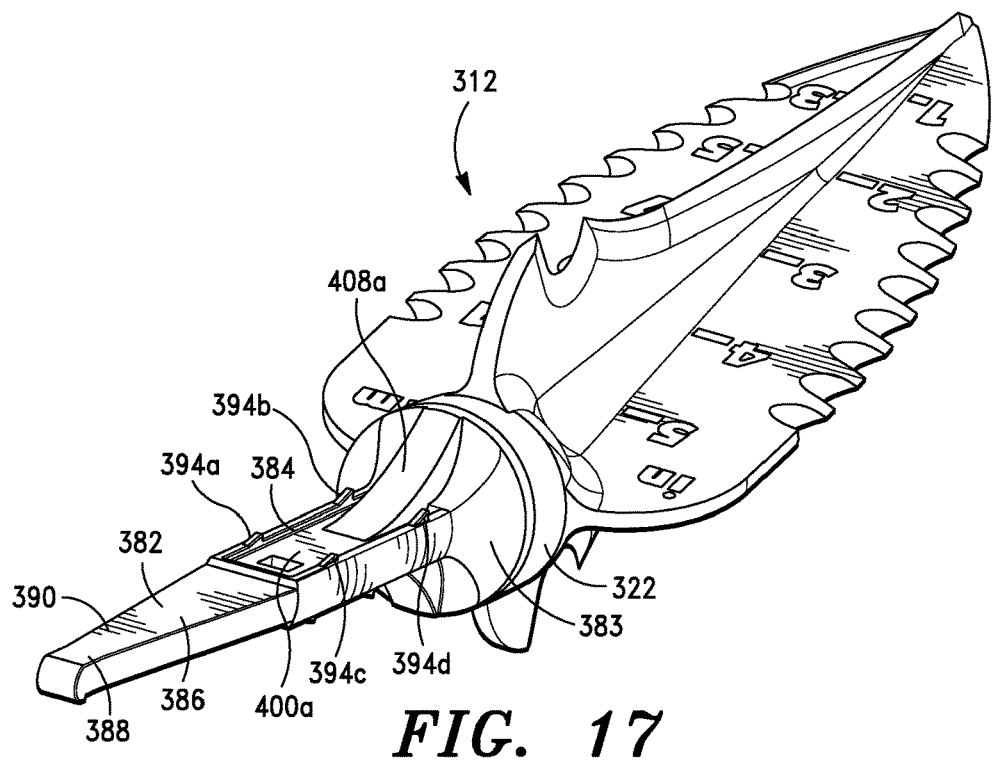
FIG. 17 is a top perspective view of the blade assembly and tang of the transplanter tool of FIG. 8.
Figure 22:
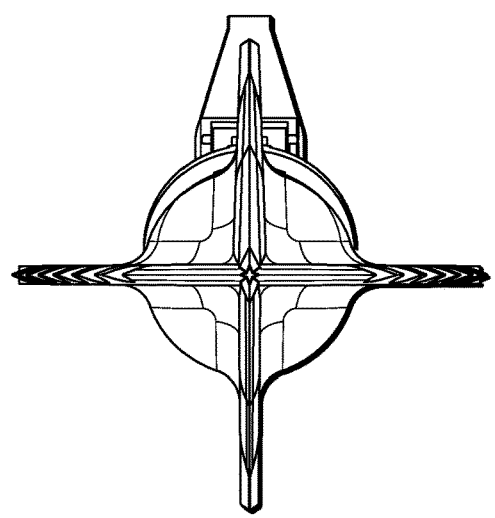
FIG. 22 is a front end view of the blade assembly and tang of the transplanter tool of FIG. 8.

As shown in FIGS. 14-15 and 17, tang 382 has a top surface 390 and a bottom surface 392 and includes a flared section 383, a first rectangular section 384, a tapered section 386, and an end section 388.

Referring to FIG. 14, flared section 383 extends a distance rearwardly from hub 322 and transitions to first rectangular section 384, first rectangular section 384 extends a distance rearwardly from flared section 383 and transitions to tapered section 386, and tapered section 386 extends a distance rearwardly from first rectangular section 383, decreasing in width, and transitions to end section 388. Referring to FIGS. 14-15, flared section 383 narrows in both its thickness and its width from where it is joined to hub 322 to where it meets first rectangular section 384. It should be understood that tang 382 need not be constructed as described and as shown in the Figures. For example, a tang of uniform width and thickness and/or that does not include any tapered sections could be used.

Figure 16:
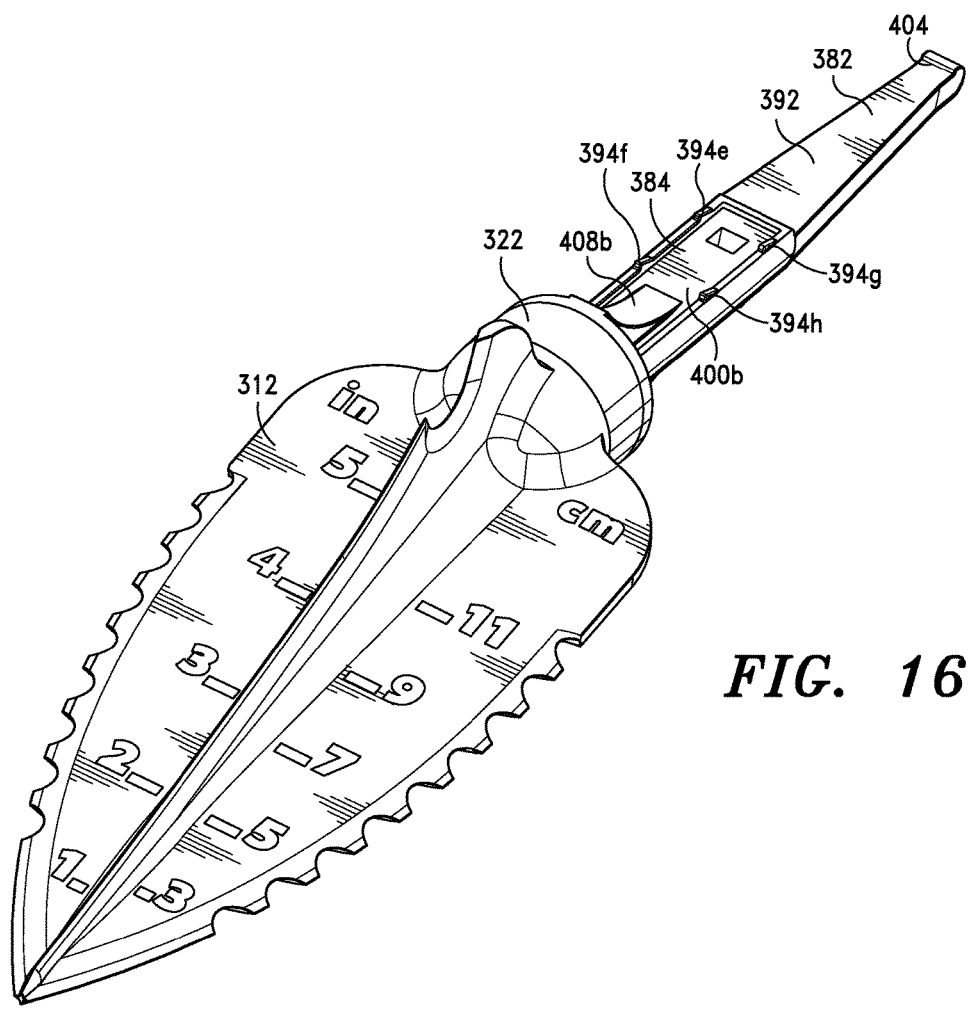
FIG. 16 is a bottom perspective view of the blade assembly and tang of the transplanter tool of FIG. 8.

Referring to FIGS. 16-17, first rectangular section 384 includes a plurality of teeth 394 positioned thereon. Teeth 394a-d are positioned on top surface 390 and teeth 394e-h are positioned on bottom surface 392. Looking to FIG. 15, and as discussed below, teeth 394 each include rake faces 396 oriented toward blade assembly 312 and relief faces 398 oriented away from blade assembly 312, and teeth 394 are configured to engage an inner surface of handle 314. Referring to FIGS. 16 and 17, first rectangular section 384 further includes adhesive channels 400a and 400b within respective top and bottom surfaces 390 and 392. Referring to FIGS. 11 and 14, an adhesive drainage slot 402 extends through channels 400a and 400b of first rectangular section 384. Although tang 382 is shown with two adhesive channels, it is nonetheless within the scope of the present invention for tang 382 to include only one adhesive channel positioned on either the top surface 390 or the bottom surface 392. As discussed below, slot 402 is configured to allow an adhesive to drain from top surface 390 to bottom surface 392 or vice-versa.

Referring to FIGS. 15 and 16, at the terminal end of tang 382 furthest from hub 322, end section 388 of tang 382 includes a hook 404 on bottom surface 392 and a rounded end 406. As discussed below, end section 388 is configured to mate with a corresponding aperture in handle 314, and hook 404 is configured to engage with slot 372 and a portion of a rear face 420 of aperture ring 350.

Referring to FIGS. 15-17, tang 382 preferably further includes identical curved ribs 408a and 408b extending from the rear face of hub 322 opposite one another along top and bottom surfaces 390 and 392 of first rectangular section 384, respectively. Ribs 408a and 408b serve as gussets to provide additional strength and rigidity to the tool 310, reducing the risk of breakage at the juncture between tang 382 and hub 322.

Figure 19:
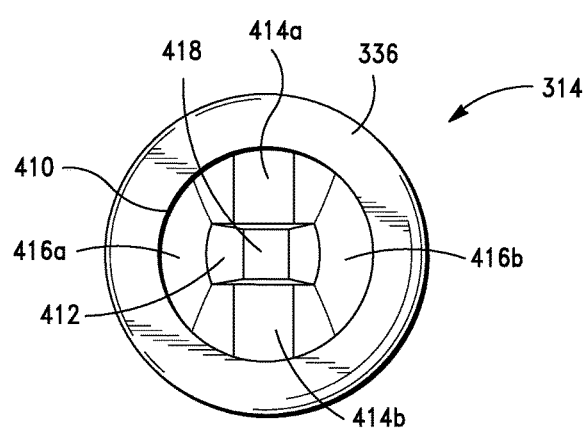
FIG. 19 is a front end view of the handle of FIG. 18.

Referring to FIGS. 18-19, handle 314 includes cylindrical boss 336. Looking to FIGS. 19 and 20B, inner cylindrical surface 410 of cylindrical boss 336 is complimentary in both size and shape to hub 322 and as such is configured to mate with a rear portion of hub 322. With reference to FIGS. 19-21, handle 314 includes an internal passageway 412 configured to receive tang 382. Internal passageway 412 includes top and bottom rib receiving recesses 414a and 414b that are configured to mate with respective ribs 408a and 408b given that they are complimentary in size and shape. Internal passageway 412 further includes flared section receiving portions 416a and 416b that are configured to mate with flared section 383. An opening 418 is located at the rear end of internal passageway of handle 314. Opening 418 has the same size and shape as outer perimeter 378 of slot 372 of aperture ring 350 and both aligns with and abuts slot 372.

As shown in FIG. 20B, rounded end 406 of end section 388 of tang 382 extends through aligned opening 418 and slot 372. The tip of rounded end 406 is visible when viewed from either top side 355 or bottom side 357 of aperture ring 350. Hook 404 is engaged with rear face 420 of front end 366 of aperture ring 350 adjacent angled sidewall 374*b* of slot 372, securing tang 382 to aperture ring 350 of handle 314 via interference to mechanically lock tang 382 in place. Sidewalls 374*a-c* also exert force against bottom surface 392 and sides of tang 382, further increasing the strength of tool 310 and preventing blade assembly 312 from sliding out of handle 314. The portion of internal passageway 412 that is immediately adjacent first rectangular section 384 of tang 382 is configured to envelope first rectangular section. Accordingly, teeth 394 frictionally engage the walls of internal passageway 412. In this configuration, and as discussed more fully below, tang 382 is locked within handle by two separate and distinct sets of features, the first being the engagement of tang 382 with aperture ring 350, and the second being the engagement of teeth 394 with an inner surface of internal passageway 412. Additionally, and as also discussed below, tang 382 can be locked within handle 314 with an adhesive.

The first step in assembling transplanter tool 310 is to press aperture ring 646 into handle 314 as described above. The second step in assembling transplanter tool 310 is to insert tang 382 into handle 314 as shown in FIG. 20A. As shown, tang 382 may be press fit into handle 314. As tang 382 moves through internal passageway 412, rounded end 406 of end section 388 passes through aligned opening 418 and slot 372. Angled surfaces 374*a-c* aid in guiding rounded end 406 through aligned opening 418 and slot 372, and as rounded end 406 passes angled surface 374*b*, rounded end 406 and hook 404 are pushed up due to the contact of rounded end 406 with the inclined surface of angled surface 374*b*. With reference to FIGS. 20A-B, once hook 404 is past angled surface 374*b*, because the remainder of end section 388 is slightly thinner than rounded end 406, rounded end 406 and hook 404 move back to their original positions such that hook 404 engages and abuts a rear face 420 of aperture ring 350 and angled surface 374*b* of aperture ring 350. As teeth 394 move through internal passageway 412, the relief faces 398 of teeth 394 (labeled and shown in FIG. 15) allow tang 382 to be more easily inserted in handle 314. In contrast, rake faces 396 of teeth 394 (labeled and shown in FIG. 15) serve to prevent tang 382 from being removed from handle 314 by cutting into the walls of internal passageway 412. With reference to FIGS. 11 and 20A-B, prior to assembly of tool 310, an adhesive such as epoxy can also be poured into one of channels 400*a-b* (see also FIG. 16) of first rectangular section 384 of tang 382. Drainage slot 402 in turn allows the adhesive to drain to the other one of channels 400*a-b*, and once the adhesive cures, it bonds both top and bottom surfaces 390 and 392 of first rectangular section 384 to the walls of internal passageway 412.

It should be understood that although tang 382 is configured to mate with aperture ring 350 as described above, it is nonetheless within the scope of the present invention for tang 382 to include a hook 404 that engages with another feature of handle 314. For example, slot 372 could be located somewhere else within internal passageway 412 and could be formed integrally with handle 314. Hook 404 of tang 382 could likewise be configured to mate with a feature other than slot 372. Furthermore, tang 382 need not necessarily include a hook 404, and need only engage with a portion of an opposing surface of handle 314 that faces away from implement 312.

Securing handle 314 to tang 382 in one or more of the ways described above results in an integral, strong handle assembly. This prevents handle 314 from turning relative to blade assembly 312 when transplanter tool 310 is in use. The weight of tang 382 further acts to balance handle 314, further enhancing the usability of tool 310.

Thus, as just described, the hand-held multi-blade garden transplanter tool of the present invention is well suited for a variety of garden tasks such as scoring, digging, working and moving soil, and cutting plants, lawn bags, ropes, and other garden tasks.

From the foregoing it will be seen that this invention is one well adapted to attain all ends and objectives hereinabove set forth, together with the other advantages which are obvious and which are inherent to the invention.

Since many possible embodiments may be made of the invention without departing from the scope thereof, it is to be understood that all matters herein set forth or shown in the accompanying drawings are to be interpreted as illustrative, and not in a limiting sense.

While specific embodiments have been shown and discussed, various modifications may of course be made, and the invention is not limited to the specific forms or arrangement of parts and steps described herein, except insofar as such limitations are included in the following claims. Further, it will be understood that certain features and subcombinations are of utility and may be employed without reference to other features and subcombinations. This is contemplated by and is within the scope of the claims.

What is claimed and desired to be secured by Letters Patent is as follows:

1. A hand tool comprising:
an implement;
a tang extending from said implement;
a handle secured to said tang, said handle comprising an internal passageway configured to receive said tang;
wherein said handle comprises an opposing surface facing away from said implement, said opposing surface being defined by an aperture ring extending through said handle generally perpendicular a longitudinal axis of said tool; and
wherein an end of said tang extends through a slot in said aperture ring, and wherein a portion of said tang is in abutting contact with an inner surface of said slot and a portion of said tang is in abutting contact with a portion of said opposing surface defined by said aperture ring to mechanically lock the handle and tang together.

2. The tool of claim 1, wherein a portion of an end of said tang is in abutting contact with a portion of said opposing surface.

3. The tool of claim 1, wherein said end of said tang comprises a hook in abutting contact with a portion of said opposing surface.

4. The tool of claim 1, wherein said opposing surface extends generally perpendicular a longitudinal axis of said tool.

5. The tool of claim 1, wherein said tang is press fit into said internal passageway.

6. The tool of claim 1, wherein a portion of said inner surface of said slot adjacent said opposing surface is angled to press against a portion of said tang.

7. The tool of claim 1, wherein said implement is selected from the group consisting of a planter, a shovel, a trowel, a hoe, a transplanter, a cultivator, a rake, and a scoop.

8. The tool of claim 1, wherein said implement comprises a plurality of three or more blades extending outward along a center axis.

9. The tool of claim 8, wherein said angle is between approximately 0 and 30 degrees.

10. The tool of claim 9, wherein said angle is approximately 15 degrees.

11. The tool of claim 1, wherein said tang extends at least approximately ½ a length of the handle and up to the entire length of the handle.

12. The tool of claim 1, wherein said tang extends at least approximately ⅝ a length of said handle.

13. The tool of claim 11, wherein said tang extends approximately ¾ to ⅚ of a length of said handle.

14. The tool of claim 1, wherein said tang comprises teeth that are configured to engage a portion of said handle along said internal passageway.

15. The tool of claim 1, wherein said tang comprises a channel on a first surface of said tang configured to receive an adhesive, wherein said channel comprises a slot, and wherein said slot is configured to allow an adhesive to drain from said first surface of said tang to a second surface of said tang.

16. The tool of claim 1, wherein said implement comprises a hub and at least one rib extending from said hub to said tang.

17. The tool of claim 16, wherein said handle comprises a boss having a shape complimentary to said hub and wherein said boss is configured to receive a portion of said hub.

18. The tool of claim 1, wherein said handle extends at an angle from a center axis of said implement.

19. The tool of claim 1, wherein said handle comprises a flared safety barrier positioned adjacent said implement.

20. The tool of claim 1, wherein said handle includes a rounded, bulbous end cap configured to allow a user to exert force on the handle using a palm of the user's hand.

21. The tool of claim 1, wherein said handle is symmetrical about a central axis.

22. The tool of claim 1, wherein said tang and said aperture ring are formed from a material having a higher durometer than said handle.

23. The tool of claim 22, wherein said tang and said aperture ring are formed from metal selected from the group consisting of aluminum, iron, steel, and combinations thereof.

24. The tool of claim 23, wherein said handle is formed from a material selected from the group consisting of plastic, rubber, composite and combinations thereof.

25. The tool of claim 1, wherein said tang is formed from a material having a higher durometer than said handle.

26. The tool of claim 25, wherein said tang is formed from metal selected from the group consisting of aluminum, iron, steel, and combinations thereof.

27. The tool of claim 26, wherein said handle is formed from a material selected from the group consisting of plastic, rubber, composite and combinations thereof.

28. The tool of claim 1, further comprising:
a blade assembly comprising at least three blades extending outward along a center axis from a free end to a handle end; and
said handle secured at said handle end.

29. The transplanter tool of claim 28, wherein said blade assembly comprises four blades terminating in a pointed free end.

30. The transplanter tool of claim 28, wherein said blades are arranged symmetrically around said center axis.

31. The tool of claim 1, further comprising at least one blade that comprises serrations.

32. The tool of claim 1, further comprising at least one blade that comprises a knife edge.

33. The tool of claim 1, further comprising at least one blade that comprises graduation markings.

34. The tool of claim 1, further comprising at least one blade that comprises a notch.

35. The tool of claim 1, further comprising at least one blade that comprises a concave outer edge.

36. The tool of claim 1, further comprising at least one blade that comprises a convex outer edge.

* * * * *